(12) United States Patent
Ninomiya et al.

(10) Patent No.: US 7,402,613 B2
(45) Date of Patent: *Jul. 22, 2008

(54) COLORED FINE PARTICLE DISPERSION AND A WATER-BASED INK FOR AN INK-JET SYSTEM

(75) Inventors: Hidetaka Ninomiya, Mitaka (JP); Hiroaki Ando, Hachioji (JP)

(73) Assignee: Konica Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/237,433

(22) Filed: Sep. 6, 2002

(65) Prior Publication Data

US 2003/0055115 A1     Mar. 20, 2003

(30) Foreign Application Priority Data

Sep. 17, 2001 (JP) .............................. 2001-281321
Dec. 13, 2001 (JP) .............................. 2001-379785

(51) Int. Cl.
| | |
|---|---|
| C08F 290/04 | (2006.01) |
| C08J 3/00 | (2006.01) |
| C08K 9/00 | (2006.01) |
| C08L 31/00 | (2006.01) |
| C08L 33/00 | (2006.01) |
| C08L 51/00 | (2006.01) |
| C08L 83/00 | (2006.01) |
| B41J 2/01 | (2006.01) |
| B41J 2/17 | (2006.01) |
| C09D 11/00 | (2006.01) |
| C09D 151/00 | (2006.01) |
| G01D 11/00 | (2006.01) |

(52) U.S. Cl. ................. 523/160; 106/31.27; 106/31.6; 347/1; 347/84; 347/95; 347/100; 523/161; 523/201; 523/205; 524/558; 524/504; 525/902

(58) Field of Classification Search .............. 523/160, 523/161, 201, 205; 524/558, 504; 106/31.27, 106/31.6; 347/1, 84, 95, 100; 525/902
See application file for complete search history.

(56) References Cited

U.S. PATENT DOCUMENTS

| | | | | |
|---|---|---|---|---|
| 4,623,689 A | * | 11/1986 | Shintani et al. | 524/457 |
| 5,531,816 A | * | 7/1996 | Wickramanayake | 106/31.78 |
| 6,031,019 A | * | 2/2000 | Tsutsumi et al. | 523/160 |
| 6,057,384 A | * | 5/2000 | Nguyen et al. | 523/160 |
| 6,620,229 B2 | * | 9/2003 | Doi et al. | 106/31.6 |
| 6,676,736 B2 | * | 1/2004 | Nakano et al. | 106/31.58 |
| 6,712,894 B2 | * | 3/2004 | Shepard | 106/31.6 |
| 6,777,463 B2 | * | 8/2004 | Ando et al. | 523/160 |
| 7,037,957 B2 | * | 5/2006 | Ninomiya et al. | 523/160 |
| 2001/0020056 A1 | * | 9/2001 | Yamanouchi et al. | 523/161 |
| 2001/0036979 A1 | * | 11/2001 | Yamanouchi et al. | 523/161 |
| 2003/0008939 A1 | * | 1/2003 | Ando et al. | 523/160 |
| 2003/0008942 A1 | * | 1/2003 | Ninomiya et al. | 523/160 |
| 2003/0027892 A1 | * | 2/2003 | Wang et al. | 523/160 |
| 2003/0193554 A1 | * | 10/2003 | Bullock et al. | 347/100 |
| 2003/0195274 A1 | * | 10/2003 | Nakamura et al. | 523/160 |
| 2003/0225185 A1 | * | 12/2003 | Akers et al. | 523/160 |
| 2003/0236321 A1 | * | 12/2003 | Sano et al. | 523/160 |

FOREIGN PATENT DOCUMENTS

| | | | |
|---|---|---|---|
| WO | WO 97/23575 A1 | * | 7/1997 |
| WO | WO 00/53597 | | 9/2000 |
| WO | WO 01/30919 A1 | * | 5/2001 |
| WO | WO 02/18504 | | 3/2002 |

* cited by examiner

*Primary Examiner*—Patrick D Niland
(74) *Attorney, Agent, or Firm*—Squire, Sanders & Dempsey L.L.P.

(57) ABSTRACT

A water-based ink for ink-jet printing, comprising colored particles containing: (a) a core particle having a colorant; and (b) a shell having a resin and encapsulating the core particle, wherein the resin comprises a monomer unit having a hydroxyl group in an amount of 0.1 to 50 weight % based on the total weight of the shell.

7 Claims, No Drawings

COLORED FINE PARTICLE DISPERSION AND A WATER-BASED INK FOR AN INK-JET SYSTEM

FIELD OF THE INVENTION

The present invention relates to a core-shell type colorant-including colored fine particle having superior dispersion stability, and an ink utilized for an ink-jet system by use thereof that exhibits improved color reproduction quality and improved image stability, and an image recording method by using the ink.

BACKGROUND OF THE INVENTION

In recent years, elimination of solvents and use of water-based constitution have been demanded in the field of recording materials and an inking material utilized for printers, printing machines, markers and writing tools. Especially, there have been widely used recording materials comprising mainly an aqueous solution of a water-soluble dye and those comprising mainly a fine particle dispersion of a pigment for a water-based ink of ink-jet recording.

In a water-based ink comprising a water-soluble dye, there is used an aqueous solution of a water-soluble dye selected from the group of dyes that are categorized mainly into acid dyes, direct dyes and some food dyes. To the aqueous solution is added a glycol or an alkanolamine as a wetting agent, a surfactant or an alcohol to adjust the surface tension, thickeners and other agents according to need. The water-based inks using water-soluble dyes are most commonly used because of their high reliability of anti-clogging at pen tips or in a printer. The water-based inks using water-soluble dyes, however, easily cause blotting on recording paper because they comprise an aqueous solution of dyes. Therefore, they have only limited uses and their print quality tends to be deteriorated due to blotting of the ink. In addition, water-soluble dyes that only permeate into the recording material and are then dried to adhere in the recording paper, can hardly be said to be "dyed". Thus, the light fastness of such water-based inks is not fully satisfactory.

Further, proposals of coloring water-dispersible resins with an oil dye or a hydrophobic dye as an ink utilized for ink-jet recording have been made in order to solve problems of low water resistance and low light fastness of water-based inks utilizing water soluble dyes. Inks utilized for ink-jet recording using emulsion polymerization particles or dispersed polymerization particles colored with an oil dye have been proposed, for example, in JP-A No. 55-139471 (the term, JP-A refers to an unexamined and published Japanese Patent Application), JP-A No. 58-45272, JP-A No. 3-250069, JP-A No. 8-253720, JP-A No. 8-92513, JP-A No. 8-183920 and JP-A No. 2001-11347.

Proposals have been made of not only coloring water-dispersible resins with an oil dye or hydrophobic dye but also utilizing colored fine particles comprising a colorant and a resin that is coated with the colorant, and also utilizing colored fine particles comprising a colorant and a resin further coated with a film-forming resin on the surface of the particles.

In a water-based ink utilizing these colored fine particles, there are problems in that the effect to improve light fastness is decreased and enhancing properties such as dispersion stability and discharge stability, which are needed for an ink utilized for an ink-jet system, are difficult, when the dyes remain on the surfaces of the particles or the dyes are separated from the particles.

On the other hand, in a pigment ink comprising mainly fine particle dispersion of a pigment, disclosed have been several proposals of coating the surface of a pigment with a film-forming resin in order to reduce problems of not obtaining enough density or poor color reproduction quality due to bronzing, and further, to improve light fastness, dispersion stability and discharge stability. Examples of coating a pigment with a resin are described in JP-A No. 8-269374, JP-A No. 9-151342, JP-A No. 10-88045 and JP-A No. 10-292143.

The above-mentioned colored fine particles produced by covering colored particles or colorant fine particles such as pigment particles have the possibility of overcoming problems accompanied with a water-based ink so as to achieve excellent recording quality. However, there still remain problems of dispersion stability after preparation of an ink, and requires special techniques in the production process. Additionally, dispersion stability in an aqueous medium is not fully sufficient and as a result, stability as an ink and discharge stability of an ink do not reach sufficient levels as required.

Accordingly, an object of the present invention is to provide a colored fine particle dispersion used in an ink for an ink-jet system that can be manufactured stably and having excellent dispersion stability. A further object is to provide a water-based ink comprising the colored fine particle dispersion and utilized for an ink-jet system having good stability. A still further object is to provide an image forming method by using the ink.

SUMMARY OF THE INVENTION

The foregoing objects of the present invention can be accomplished by the following embodiments.

1. A water-based ink for ink-jet printing, comprising colored particles containing:
   (a) a core particle having a colorant; and
   (b) a shell having a resin and encapsulating the core particle,
   wherein the resin comprises a monomer unit having a hydroxyl group in an amount of 0.1 to 50 weight % based on the total weight of the shell.
2. The water-based ink of item 1,
   wherein the resin in the shell does not comprise a monomer unit having a dissociation group exhibiting a pKa value of 3 to 7.
3. The water-based ink of item 1,
   wherein the monomer unit having a hydroxyl group is selected from the group consisting derivatives of hydroxyethyl methacrylate.
4. The water-based ink of item 1,
   wherein the colored particles have a volume average particle diameter of at most 100 nm.
5. The water-based ink of item 1,
   wherein the shell is made by a process comprising the steps of:
   (a) adding into a water dispersion of the core particles a mixture of monomer units comprising a monomer unit having a hydroxyl group in an amount of 0.1 to 50 weight % based on the total weight of the mixture of the monomer units; and
   (b) polymerizing the mixture of the monomer units on the surface of the core particles to form the shell.
6. An image forming method comprising the step of:
   jetting droplets of an ink of item 1 through a plurality of ink-jet head nozzles onto an image receiving media in accordance with a digital signal supplied to an ink-jet apparatus.

DETAILED DESCRIPTION OF THE PRESENT INVENTION

The present invention will now be detailed below.

In the aforementioned unexamined and published Japanese Patent Applications are described colored fine particles of a resin containing a colorant of a pigment or a dye, colored fine particles comprising a pigment or a dye coated with a resin, and complex colored fine particles in which colored fine particles (colorant particles) comprising resin containing a pigment or a dye which is coated with another resin. Further, a water-based ink containing these colored fine particles is disclosed, and furthermore, it is also described as an ink having high fastness and high color reproduction quality obtained by utilizing the complex colored fine particles containing these colored fine particles or resin coating. It was shown that the ink overcame the drawbacks of the above-mentioned pigment ink and dye ink.

In colored fine particles (colorant particles) containing a pigment or a dye, or the aforementioned complex colored fine particles, in which the colorant particles comprising the pigment itself or resin particles containing a pigment or a dye is coated with another resin. However, the resin of the outermost surface or the resin forming the coated layer of the outermost surface exhibits problems. These problems are; insufficient dispersion stability of the resin colored fine particle dispersion; and the colored fine particle dispersion having enough stability cannot be obtained as a result of the low stability during production of the colored fine particles. The inventors of the present invention have found that the aqueous dispersion of the colored fine particles having enough stability due to greatly improved stability of the aforementioned colored fine particles have been obtained by coating with a resin having a specific composition, in other words, by the determination of the particular composition of the polymer for coating.

In an aqueous dispersion of colorant particles (pigment cores or dye cores) containing a pigment or a dye of the present invention, the drawbacks of insufficient dispersion stability of the colored fine particle dispersion itself having the polymer resin coating and a lack of stability during production of resin coated colored fine particles, can be overcome by means of coating (or encapsulating) the colorant particles with the following resin. The resin contains a monomer unit having a hydroxyl group in an amount of 0.1 to 50 weight % of the total resin weight, and does not contain a monomer unit having a dissociation group exhibiting a pKa value of 3 to 7.

Particularly, the colorant contained in the colored particles is preferred a dye.

In the present invention, an aqueous medium means a system which is composed of mainly a hydrophilic medium containing water of approximately more than 40%, preferably more than 70% and more preferably more than 90%. It may also contain hydrophilic organic solvents such as alcohols and polyols. Further, water is still more preferable. An aqueous dispersion here mentioned is a dispersion the medium of which contains the above-mentioned aqueous mediums.

Generally, in order to secure stability of an aqueous dispersion such as polymer resin, a surfactant having a dissociation group capable of forming an electric double layer, is absorbed on the surfaces of dye particles. Further, several methods may be employed. Examples of these are polymerizing monomers having a carboxylic acid group exhibiting the above-mentioned pKa value range of 3 to 7, which may be obtained by methods in which dissociation groups are combined to the particles themselves; and, in which a polymer resin comprises monomers having the groups to form the above-mentioned electric double layers. Specifically, in the latter method, an electric double layer formed in an aqueous medium has a high stability improvement effect. The electric double layer has a property that is hardly affected by a disturbance factor from outside such as another component, e. g. a surfactant, in an aqueous dispersion.

However, the inventors of the present invention have found that stability is rather decreased with an excessive presence of these groups in an aqueous dispersion of colorant particles and the influence of a hydration sphere formed on the periphery of colored fine particles by non-dissociation hydroxyl group is rather large. Thus, the present invention was achieved. But, any stability improving effect is rather weakened by too many monomer units having a hydroxyl group, and it is thought that stability of a hydration sphere is adversely affected by a predominance of a hydrogen bond among hydroxyl groups on surfaces because of too much density of hydroxyl groups on the surfaces. Accordingly, monomer units having hydroxyl groups are required to be contained in a range of at least 0.1% to less than 50% by weight based on the total polymer weight.

Therefore, it is important in the present invention, that a coating resin of colorant particles contains monomer units having a hydroxyl group in an amount of 0.1 to 50 weight % based on the total weight of the resin. It is also important, at the same time, that the resin does not contain monomer units having a dissociation group exhibiting the above-mentioned pKa value of 3 to 7.

"The resin does not contain monomer units having a dissociation group exhibiting the above-mentioned pKa value of 3 to 7" does not only indicate the resin completely free from such monomer units. The resin may contain such monomer units as an impurity. The amount of the impurity here is in a range of at most 3 weight % and preferably at most 1 weight % based on the total weight of the resin.

When the weight ratio of a monomer unit having a dissociation group to a monomer unit having a hydroxyl group is more than 1.0, stability of the dispersion is deteriorated and stability of an ink is damaged. The reason is thought to be that; interaction of the dissociation groups with each other or interaction of the dissociation group and other components in an aqueous dispersion of colorant fine particles becomes greater than the stabilization effect of the dissociation group; aggregation is caused in a dispersion during the production process. Aggregation also takes place in an ink when the aqueous dispersion of colored fine particles is used for the ink.

Preferably employed as a resin having hydroxyl group in a molecule to coat a colorant particle for a shell is a resin having a unit formed by polymerization of a polymeric unsaturated monomer having a hydroxyl group in a molecule. Especially, preferable are esters of acrylic acid or methacrylic acid with an alkyl group having a hydroxyl group. For example, a monomer selected from esters of hydroxyl alkyls such as hydroxyethyl is preferred. More particularly preferred is a monomer selected from the hydroxyalkylesters of acrylic acid containing at least one hydroxyethylmethacrylate.

In a dispersion of colored fine particles of the present invention, a composition of a resin comprising a surface or a surface layer of the colored fine particles may contain the above-mentioned structure. Preferred are colored fine particles (colorant particles) comprising colored fine particles coated on a colorant particle such as pigment with a resin, or colored fine particles having a core-shell structure further coated with colored fine particles (colorant particles) with another resin, the particles of which are comprised of a resin containing a pigment or a dye. A resin comprising a shell of the colored fine particle preferably contains the above-mentioned composition.

Colored fine particles having a core-shell structure according to the present invention may be prepared by a method in which a polymer shell is provided after first preparing a colorant containing polymer core, or by a method in which a core and a shell are simultaneously prepared.

<A case of providing a shell after preparation of a core of fine particles (i.e., colorant particles)>

A dye-containing polymer to constitute a core can be prepared by various methods when a dye is used as a colorant. For example, following methods can be employed: a method in which an oil dye is dissolved in a monomer, and after being emulsified in water the dye is incorporated into a polymer by polymerization; a method in which a polymer and a dye are dissolved in organic solvents, and after being dispersed in water the organic solvents are removed; and a method in which porous polymer fine particles are added to a dye solution after which the dye is adsorbed and impregnated into the fine particles. When a pigment is used as a colorant, the pigment itself can also be used as a core. The following methods can be used to prepare a polymer shell: a method in which a water-soluble polymer dispersant is added and adsorbed to a water-based suspension of a polymer which is to constitute a core; a method in which a monomer is gradually added dropwise and is polymerized to precipitate on a core surface; and a method in which a polymer dissolved in organic solvents is gradually added dropwise and precipitated to be adsorbed on a core surface. In the present invention, for example, hydroxyethylmethacrylate and a polymerizable monomer having an unsaturated double bond are gradually added dropwise to a water-based suspension of a polymer which is to constitute a core in order to be precipitated on the surface of the core to yield a shell.

Further, it is also possible that a pigment is mixed with a polymer to yield a paste, then is dispersed in an aqueous phase to prepare a polymer-coated pigment core, and thus, a shell is provided by the above-mentioned method.

In the present invention, a method is particularly preferable in which a monomer is gradually added dropwise to a water-based suspension of a polymer which should become a core so that precipitation on a core surface occurs immediately after polymerization.

<Method to prepare simultaneously a core and a shell during formation of a fine particle>

There is a method in which a core forming polymer and a dye or a pigment are dissolved or dispersed in a monomer which is to constitute a shell and suspension polymerization is performed in water. There is also a method in which emulsion polymerization is performed while the solution is gradually added dropwise into water containing surfactant micells. A monomer may constitute a core, and a polymer may constitute a shell. Further, there is a method in which a dye or a pigment is dissolved or dispersed in a mixed solution of a monomer which is to constitute a core, and the monomer which is to constitute a shell after the polymerization, after which suspension polymerization or emulsion polymerization is performed.

<Evaluation of core-shell formation>

It is important to evaluate whether a core-shell is actually formed or not. In the present invention, each particle diameter is very small, being not more than 200 nm, and analytical methods are limited by considering the resolution of the analytical methods applied. As analytical methods to achieve such an object, TEM or TOF-SIMS is applicable. In case of observing fine core-shell particles via TEM, they can be observed by the dispersed solution being coated and dried on a carbon support film. There is a case in which the observed images of TEM have low contrast due to the sole use of the organic polymer. For such case, it is necessary to dye the fine particles by use of compounds such as osmium tetraoxide, ruthenium tetraoxide, chloro sulfonic acid/uranyl acetate and silver sulfide in order to evaluate core-shell formation. Fine particles comprising only a core are dyed and TEM observation thereof is performed, subsequently, to be compared with that of fine particles provided with a shell. Further, fine particles provided with a shell and those without a shell after being mixed are dyed, and confirmation is made whether the ratio of fine particles having different degrees of dyeing is identical to the ratio of the presence to the absence of a shell.

With a mass spectrometer such as TOF-SIMS, confirmation is made by the fact that the amount of a colorant neighboring a surface is reduced by providing a shell on a particle surface compared to that having only a core i.e. without a shell. When an element, which is not contained in a polymer constituting a core-shell is present in a colorant, whether a shell having a lower colorant content is provided or not can be confirmed by utilizing the element as a probe.

In other words, a colorant content ratio (concentration) can be obtained, by the use of TOF-SIMS, by firstly measuring the total amount of ions having a mass number from 1 to 1000 with respect to each fine particle surface, and by determining the ratio, among others, of the total amount of ions arising from elements which are contained in a dye but are not contained in a core-shell polymer. By this method, comparing each colorant content ratio of a shell to a core without core-shell formation, each colorant content ratio (concentration) can be determined. Since TOF-SIMS can perform elementary analysis to a depth of a few nm from a surface, it is possible to analyze such core-shell fine particles of the present invention.

When there is no such element, by using a suitable dyeing agent, the colorant content in a shell can be compared with that of particles without a shell.

Further, core-shell formation can be more clearly observed by burying core-shell particles in an epoxy resin, preparing an ultra-thin slice (about 1 µm) employing a microtome and dyeing the slice. As described above, when there is an element which can be a probe in a polymer or colorant, the composition of a core-shell and the distribution of a colorant in a core and a shell also can be estimated.

It is important to optimize the recipe and to select a suitable emulsifying method in order to obtain the desired particle diameter. The recipe varies depending on a colorant and a polymer used, but it is necessary that a polymer constituting a shell is generally more hydrophilic than a polymer constituting a core because they are the suspensions in water. An amount of a colorant contained in a polymer constituting the shell is preferably less than that in a polymer constituting a core, and a colorant is necessary to be less hydrophilic than a polymer constituting a shell. Hydrophilicity and hydrophobicity, for example, can be estimated by using a solubility parameter (SP). For the solubility parameters it can be referred to the description in POLYMER HANDBOOK, 4th edition (JOHN WILLY & SONS, INC.) from page 675, regarding to value, measurement and calculation.

Further, a polymer used for a core preferably has a number average molecular weight of 500 to 100,000, and specifically preferably 1,000 to 30,000, in terms of film forming ability after printing, durability thereof and suspension forming ability.

A variety of Tg of the polymer can be acceptable, however, at least one kind of the polymers preferably has a Tg of at least 10° C.

In the present invention, almost all of commonly known polymers can be used. However, specifically preferable polymers as a main functional group are; polymers containing an acetal group; polymers containing a carbonic ester group; polymers containing a hydroxyl group; and polymers containing an ester group. The aforementioned polymers may be substituted by substituents, and the substituents may have a straight chain, a branched chain or a cyclic structure. Further, a variety of polymers having the functional groups described above are available on the market, however, they can also be synthesized by commonly known methods. The copolymers also can be prepared, for example, by introducing an epoxy group into a polymer molecule followed by condensation polymerization with other polymers, or by graft polymerization using light or radiation.

Specifically preferred polymers for a core are; polystyrene, acrylic polymer, styrene-acrylic copolymer, polyvinylbutyral, polyurethane, polycarbonate and polyester.

Specifically preferred polymers for a shell are resins prepared by radical polymerization or condensation polymerization. Examples of such resins are; polystyrene, acrylic polymer, styrene-acrylic copolymer and polyurethane.

In a preferable dispersion of colored fine particles in the present invention, a polymer core mainly contributes to include a colorant so as to keep the fastness and the color tone constant. While a polymer shell contributes to enhance stability of the colorant-containing fine particles as an ink suspension as well as to accelerate fixing and to prevent coagulation of a colorant on a medium, to improve image quality, and also to keep the fastness and the color tone of the colorant constant.

A colorant content ratio (concentration) in a shell is commonly not more than 0.8 of that in a core without core-shell formation, but preferably is not more than 0.5.

The colorant content (concentration) can be determined using a mass spectrometer such as TOF-SIMS. In TOF-SIMS, first measured is the total amount of ions having a mass number of from 1 to 1,000 with respect to each fine particle surface, and the colorant content can be determined from the total amount of ions attributed to dyes. The colorant content of shells and of cores which are not converted into a core-shell form, is then compared. Since TOF-SIMS can perform elementary analysis to a depth of a few nm from the surface, it is possible to analyze such core-shell type fine particles of the present invention.

In the present invention, since colorant-containing core-shell colored fine particles used in a polymer emulsion type water-based ink have a very large surface area per unit volume when the volume average particle diameter is less than 5 nm, the effect of incorporating a colorant in a core-shell polymer is decreased. On the other hand, particles having a particle diameter of over 200 nm tend to clog the printing head, as well as to precipitate in an ink, causing the storage stability of an ink to deteriorate. Consequently, the particle diameter is preferably 5 to 400 nm, and more preferably 10 to 150 nm. When the particle diameter exceeds 150 nm, it causes deterioration of glossiness of images recorded on a glossy medium or deterioration of transparency with images recorded on a transparent medium. Further, when the average particle diameter of pigment dispersion is less than 10 nm, stability of the pigment dispersion tends to be lowered and storage stability of an ink is easily deteriorated. Thus, the average particle diameter of pigment dispersion is preferably 10 to 100 nm.

A volume average particle diameter can be determined by spherical conversion of a circular equivalent particle diameter obtained from the value of projected areas (for at least 100 particles) in a transmission type electron micrograph (TEM). A volume average particle diameter and its standard deviation are thus determined and a variation coefficient is calculated by dividing the standard deviation by the volume average particle diameter. A variation coefficient can also be determined by use of a dynamic light scattering method. Examples of measuring apparatus are: a laser particle analyzing system manufactured by OTSUKA ELECTRONICS CO., LTD; and Zetasizer manufactured by MALVERN Instruments Ltd.

A variation coefficient of particle diameter is the value of a standard deviation of particle diameter divided by a particle diameter, which means that the larger this value, the wider is the distribution of particle diameters. When the variation coefficient of a volume particle diameter is at least 80%, the distribution of particle diameter becomes very broad, so that the thickness of a core-shell tends to be non-homogeneous and the physical surface properties tend to vary among particles. The variation of the physical surface properties easily causes coagulation of particles which often results in clogging of ink-jet heads. Further, coagulation of particles easily causes light scattering of the colorant on a medium, resulting in deterioration of image quality. The variation coefficient is preferably not more than 50% and is more preferably not more than 30%.

In the present invention, the content of the polymer used for a shell is preferably 5 to 95 weight % of the total polymer weight. When it is less than 5 weight % the thickness of a shell is insufficient so that a portion of a core containing a large amount of colorant easily appears on the particles' surface. Further, when the polymer in a shell is excessive, it easily causes reduced ability to protect the colorant in the core. Thus it is more preferably 10 to 90 weight %.

The total content of colorant of a dye or a pigment is preferably 20 to 1,000 weight % of the total polymer weight. When the content of colorant is too low compared to the polymer, the image density is insufficiently high after ink-jet recording, while when the content of a colorant is too large, the protection capability of the polymer is insufficient.

Now, colorants which are incorporated in the aforementioned polymers will be explained.

Hue of the colorant in the present invention is commonly yellow, magenta, cyan, black, blue, green and red, and is preferably yellow, magenta, cyan and black. An oil dye is generally a dye which is soluble in organic solvents and insoluble in water. It does not have a water-soluble group such as carboxyl or sulfonyl group. It further includes an intrinsically water-soluble dye that becomes oil-soluble after salt formation with a long chain alkyl base. For example, known is a salt forming dye which is produced from an acid dye, a direct dye or a reactive dye and a long chain alkyl amine.

Oil dyes are not limited by the following, however, specifically preferable examples include the following: Orient Chemical Industries, Ltd.: Valifast Yellow 4120, Valifast Yellow 3150, Valifast Yellow 3108, Valifast Yellow 2310N, Valifast Yellow 1101, Valifast Red 3320, Valifast Red 3304, Valifast Red 1306, Valifast Blue 2610, Valifast Blue 2606, Valifast Blue 1603, Oil Yellow GG-S, Oil Yellow 3G, Oil Yellow 129, Oil Yellow 107, Oil Yellow 105, Oil Scarlet 308, Oil Red RR, Oil Red OG, Oil Red 5B, Oil Pink 312, Oil Blue BOS, Oil Blue 613, Oil Blue 2N, Oil Black BY, Oil Black BS, Oil Black 860, Oil Black 5970, Oil Black 5906, and Oil Black 5905. NIPPON KAYAKU CO., LTD.: Kayaset Yellow SF-G, Kayaset Yellow K-CL, Kayaset Yellow GN, Kayaset Yellow A-G, Kayaset Yellow 2G, Kayaset Red SF-4G, Kayaset Red K-BL, Kayaset Red A-BR, Kayaset Magenta 312, and Kayaset Blue K-FL. ARIMOTO CHEMICAL CO., LTD.: FS Yellow 1015, FS Magenta 1404, FS Cyan 1522, FS Blue 1504, C.I. Solvent Yellow 88, 83, 82, 79, 56, 29, 19, 16, 14, 04, 03, 02, 01; C.I. Solvent Red 84:1, C.I. Solvent Red 84, 218, 132, 73, 72, 51, 43, 27, 24, 18, 01; C.I. Solvent Blue 70, 67, 44, 40, 35, 11, 02, 01; C.I. Solvent Black 43, 70, 34, 29, 27, 22, 7, 3; C.I. Solvent Violet 3, C.I. Solvent Green 3 and C.I. Solvent Green 5. Further, metal complex dyes such as described in JP-A 9-277693, 10-20559 and 10-30061 are also acceptable. For example, dyes represented by Formula (1) can be employed.

Formula (1)

$$M(Dye)_1(A)_m$$

In Formula (1), M represents a metal ion, (Dye) represents a dye capable of forming a coordination bond with a metal ion, and (A) represents a ligand except a dye. "1" represents 1, 2 or 3, and "m" represents 0, 1, 2 or 3. When "m" is 0 (zero), "1" represents 2 or 3, and in this case, (Dye) may be same or different.

The metal ions represented by M are ions of metals selected from the Groups 1 through 8 of the Periodic Table. Example metal ions are; Al, Co, Cr, Cu, Fe, Mn, Mo, Ni, Sn, Ti, Pt, Pd, Zr and Zn. Ions of Ni, CU, Cr, Co, Zn, and Fe are preferable in terms of color tone and various kinds of durability, and Ni ion is specifically preferable.

Dyes represented by (Dye) and capable of forming a coordination bond with a metal ion include dyes having various dye structures, and preferably are dyes containing a coordination group in a structure of conjugated methine dye, azo methine dye and azo dye.

A disperse dye can be used as an oil dye, and disperse dyes are not limited by the following, however, specifically preferable examples are shown below. Specifically preferable examples include dyes such as C.I. Disperse Yellow 5, 42, 54, 64, 79, 82, 83, 93, 99, 100, 119, 122, 124, 126, 160, 184:1, 186, 198, 199, 204, 224 and 237; C.I. Disperse Orange 13, 29, 31:1, 33, 49, 54, 55, 66, 73, 118, 119 and 163; C.I. Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356 and 362; C.I. Disperse Violet 33; C.I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365 and 368; and C.I. Disperse Green 6:1 and 9.

Pigments are not limited by the following, however, specifically preferable examples of carbon black are listed below.

Mitsubishi Kasei Corp.: No. 2300, No. 900, MCF-88, No. 33, No. 40, No. 45, No. 52, MA7, MA8, MA100, and No.2200B.

Columbia Corp.: Raven 700, Raven 5750, Raven 5250, Raven 5000, Raven 3500, and Raven 1255.

Cabot Corp.: Regal 400R, Regal 330R, Regal 660R, Mogul L, Monarch 700, Monarch 800, Monarch 880, Monarch 900, Monarch 1000, Monarch 1100, Monarch 1300, and Monarch 1400.

Degussa AG: Color Black FW1, Color Black FW2, Color Black FE2V, Color Black FW18, Color Black FW20, Color Black S150, Color Black S160, Color Black S170, Printex 35, Printex U, Printex V, Printex 140U, Printex 140V, Special Black 6, Special Black 5, Special Blach 4A, and Special Black 4.

The Kansai Coke and Chemicals Co., Ltd.: Maxsoab G-40, Maxsoab G-15, and Maxsoab G-08.

Pigments for yellow include C. I. Pigment Yellow 1, C. I. Pigment Yellow 2, C. I. Pigment Yellow 3, C. I. Pigment Yellow 12, C. I. Pigment Yellow 13, C. I. Pigment Yellow 14, C. I. Pigment Yellow 16, C. I. Pigment Yellow 17, C. I. Pigment Yellow 73, C. I. Pigment Yellow 74, C. I. Pigment Yellow 75, C. I. Pigment Yellow 83, C. I. Pigment Yellow 93, C. I. Pigment Yellow 95, C. I. Pigment Yellow 97, C. I. Pigment Yellow 98, C. I. Pigment Yellow 114, C. I. Pigment Yellow 128, C. I. Pigment Yellow 129, C. I. Pigment Yellow 151, and C. I. Pigment Yellow 154.

Pigments for magenta include C. I. Pigment Red 5, C. I. Pigment Red 7, C. I. Pigment Red 12, C. I. Pigment Red 48(Ca), C. I. Pigment Red 48(Mn), C. I. Pigment Red 57(Ca), C. I. Pigment Red 57:1, C. I. Pigment Red 112, C. I. Pigment Red 123, C. I. Pigment Red 168, C. I. Pigment Red 184, and C. I. Pigment Red 202.

Pigments for cyan include C. I. Pigment Blue 1, C. I. Pigment Blue 2, C. I. Pigment Blue 3, C. I. Pigment Blue 15:3, C. I. Pigment Blue 15:34, C. I. Pigment Blue 16, C. I. Pigment Blue 22, C. I. Pigment Blue 60, C. I. Vat Blue 4, and C. I. Vat Blue 60.

In colored fine particles having the core-shell form of the present invention, a polymer is preferably blended in an amount of 0.5 to 50.0 weight % in a water-based ink, and more preferably in an amount of 0.5 to 30.0 weight %. When the foregoing blended content of a polymer is less than 0.5 weight %, the function to protect a colorant is insufficient, on the other hand, when the foregoing blended content of a polymer is over 50 weight %, storage stability of the suspension as an ink may decrease or clogging of the printer head may occur due to viscosity increase of the ink or coagulation of the suspension accompanied with ink evaporation at the top portion of a nozzle. Therefore the foregoing range of a blend content is preferred.

The colorant is preferably blended at 1 to 30 weight % in the ink, and more preferably at 1.5 to 25 weight %. When the blend content of a colorant is less than 1 weight % print density is insufficient. When it is over 30 weight %, aging stability may be reduced due to increase of the particle diameter caused by, for example, coagulation. Therefore, the foregoing range is preferred.

An ink of the present invention, utilizing water as a medium, comprises a polymer suspension incorporating the foregoing colorant, and various kinds of conventional additives, well known in the art. Examples of the additives that may be contained in the suspension are; a wetting agent such as polyalcohols, a dispersant, an antifoaming agent such as a silicone type, an anti-mold agent such as chloromethyl phenol, and/or a chelating agent such as EDTA, or an oxygen absorbing agent such as a sulfite salt type.

As the foregoing wetting agent, for example, polyalcols such as ethylene glycol, propylene glycol, diethylene glycol, triethylene glycol, tetraethylene glycol, polyethylene glycol, glycerin, diethylene glycol diethylether, diethylene glycol mono-n-butylether, ethylene glycol monomethylether, ethylene glycol monoethylether, ethylene glycol monobutylether, methylcarbitol, ethylcarbitol, butylcarbitol, ethylcarbitol acetate, diethylcarbitol, triethylene glycol monomethylether, triethylene glycol monoethylether and propylene glycol monomethylether; ethers thereof; acetate series; nitrogen containing compounds such as N-mehtyl-2-pyrolidone, 1,3-dimethylimidazolidine, triethanolamine, formamide, dimethylformamide; and dimethylsulfoxide can be used alone or in combination of two or more kinds. These wetting agents are not specifically limited with respect to a blending amount, and can be preferably blended at 0.1 to 50.0 weight % in the foregoing water-based ink, but more preferably at 0.1 to 30.0 weight %.

Further, the foregoing dispersant is not specifically limited, however, the HLB value thereof is preferably from 8 to 18 in order to obtain the effect as a dispersant and being effective to control the increase of particle diameter in a suspension.

As a dispersant, commercial products are also usable. Such commercial products include, for example, Dispersant SNB, MS, N, SSL, ST and P (names of the products) manufactured by Kao Corp.

The blended content of a dispersant is not specifically limited, however, it is preferably from 0.01 to 10 weight % in the water-based ink of the present invention. When the blended content of the compound is less than 0.01 weight %, it is difficult to achieve small particle diameter suspensions, and when it is over 10 weight %, the particle diameter of the suspension may increase or stability of the suspension may be lowered causing the possibility of the suspension to gel. Therefore, preferred is the foregoing range.

Further, as the foregoing antifoaming agent, there is no specific limitation and numerous commercially available products are acceptable. Such commercially available products include, for example, KF 96, 66, 69, KS 68, 604, 607A, 602, 603, KM73, 73A, 73E, 72, 72A, 72C, 72F, 82F, 70, 71, 75, 80, 83A, 85, 89, 90, 68-1F and 68-2F (names of the products) manufactured by Shin-Etsu Silicone Co., Ltd. The blending content of these compounds is not specifically limited, however, is preferably from 0.001 to 2.000 weight % in the water-based ink of the present invention. When an content of the compound is less than 0.001 weight %, it easily causes foaming at the time of ink preparation, and it is difficult to eliminate small bubbles in the ink, while when it is over 2 weight %, although foaming may be restrained, print quality may be deteriorated by generation of repellency spots or non uniform printing. Therefore, the foregoing range is preferred.

Next, a preparation method of an ink of the present invention will be explained. Ink of the present invention can be prepared by various kinds of emulsifying methods. The examples are summarized, for example, on p.86 of "Progress and Application of Functional Emulsifiers and Emulsifying Techniques" published by C. M. C. Co., Publishing Ltd. In the present invention, specifically preferably used are emulsifying dispersion apparatuses utilizing ultrasonic waves, high speed rotational shear or high pressure.

In emulsifying dispersion by means of ultrasonic waves, used can be two types, a so-called a batch type and a continuous type. A batch type is suitable for preparation of a relatively small amount of samples and a continuous type for preparation of a large amount of samples. In a continuous type, for example, an apparatus such as UH-600SR (produced by S. M. T. Co., Ltd.) can be used. In case of such a continuous type, the irradiation time of ultrasonic waves can be determined by (volume of dispersion room)/(flow speed×circulation number). When plural ultrasonic wave irradiation apparatuses are present, it can be determined by totaling each irradiation time. The irradiation time is practically not longer than 10,000 seconds. Further, if more than 10,000 seconds are required, load on the process is too great and emulsifying dispersion time has to be shortened in practice by such means as reselecting emulsifiers. For this reason, more than 10,000 seconds is not desired. It is preferably between 10 to 2,000 seconds.

As an emulsifying dispersion apparatus employing high speed rotational shear, dispermixers such as described on pages 255 and 256 of, "Progress and Application of Functional Emulsifiers and Emulsifying Techniques" published by C. M. C. Publishing Co., Ttd., homomixers such as described on page 251 and ultra-mixers such as described on page 256 can be used. These types of apparatuses can be selectively employed depending on the viscosity of the solution at emulsifying dispersion. In the emulsifying dispersion apparatuses employing high speed rotational shear, the rotational number of stirring blades is important. In the case of an apparatus having a stator, since the clearance between the stirring blade and the stator is generally approximately 0.5 mm and can not be made much less, the shear stress is mainly dependent on the circumferential speed of the stirring blade. Those having a circumferential speed of 5 to 150 m/sec can be applicable in emulsifying dispersion of the present invention. When the circumferential speed is too slow, the particle diameter often cannot be made sufficiently small even with prolonged emulsification time, while the motor power has to be extremely strengthened to achieve 150 m/sec. Preferable is a range of 20 to 100 m/sec.

In emulsifying dispersion by means of high pressure, an apparatus such as LAB2000 (produced by S. M. T. Co., Ltd.) can be used, and the emulsifying dispersion ability is dependent on the pressure applied to the sample. The pressure is preferably in the range of $10^4$ kPa to $5\times10^5$ kPa. Further, the desired particle diameter can be obtained, if necessary, by repeating emulsifying dispersion a few times. When the pressure is too low, the desired particle diameter often cannot be obtained, while it is not practical to increase the pressure to $5\times10^5$ kPa because of excess load on the apparatus. More preferable is a range of $5\times10^4$ kPa to $2\times10^5$ kPa.

These emulsifying dispersion apparatus can be utilized alone, as well as in combinations if necessary. A colloidal mill or a flow-jet mixer alone cannot achieve the object of the present invention, however, the combination with an apparatus of the present invention can enhance the effect of the present invention by enabling emulsifying dispersion over a short of time.

In an image formation by discharge of a water-based ink for ink-jet recording of the present invention, used may be an on-demand method or a continuous method ink-jet head. Further, for a discharge method, employed may be any of following methods such as an electromechanical transducing method (e.g., single cavity type, double cavity type, bender type, piston type, share mode type, and shared wall type), an electrothermal transducing method (e.g., thermal ink-jet type and bubble jet type).

In an image formation method with a water-based ink for ink-jet recording of the present invention, an ink-jet print can be obtained following an example as follows. Droplets of a water-based ink are discharged for ink-jet recording and adhering them onto an ink receptor such as an ink-jet image recording medium, using a printer fed with water-based ink, and the ink is ejected from an ink-jet head based on digital signals.

Examples of ink-jet image recording mediums that can be used are; any plain paper, coated paper, cast coated paper, glossy paper, glossy film, and OHP film. Among these, a recording medium that forms a porous layer, a so-called void layer, is preferable. The medium is not specifically limited to the above materials or a shape, and for example, a medium having a three-dimensional structure may be used as well as those formed as a sheet.

Any one of the water-based inks of the present invention can be utilized, for example, as an ink for general writing instruments such as fountain pens, ball-point pens, felt pens, other than as an ink for ink-jet recording. A suspension of the present invention can be dried to obtain a powder of fine particles, and the powder can be used for a toner of an electrophotography.

EXAMPLES

A water-based ink containing colored fine particles of the present invention will further be detailed, based on examples. However, the present invention is obviously not limited to these examples.

EXAMPLES

Example of Synthesis 1

Core-shell Type Dye Colored Fine Particle 5 g of polyvinylbutyral (BL-S, manufactured by Sekisui Chemical Co., Ltd., featuring an average polymerization degree of 350), 5 g of C.I. Solvent Blue 70 and 50 g of ethyl acetate were placed in a separable flask, after the interior of the flask was filled with gaseous by nitrogen, the foregoing polymer and dye were completely dissolved while stirring. Successively, after adding 100 g of a solution containing 2 g of sodium lauryl sulfate dropwise, the solution was emulsified by use of an ultra-sonic disperser (UH-150 type, produced by S. M. T. Co., Ltd.) for 300 seconds. Thereafter, ethyl acetate was removed under reduced pressure to obtain colored fine particles impregnating with a dye. Further, 0.15 g of potassium persulfate was added and dissolved in the dispersion solution, and heated to 70° C. by inserting a heater into the solution, and further, a solution of a mixture of 2 g of styrene and 1 g of 2-hydroxyethylmethacrylate were added dropwise and reacted for 7 hours to obtain core-shell type colored fine particles (average particle diameter: 83 nm). These colored fine particles did not contain a carboxyl group on their surface. The particle diameter stated here means the volume average particle diameter determined by using a laser particle analyzing system manufactured by OTSUKA ELECTRONICS CO., LTD.

Example of Synthesis 2

Core-shell Type Dye Colored Fine Particle 5 g of polyvinylbutyral (BL-S, manufactured by Sekisui Chemical Co., Ltd., featuring an average polymerization degree of 350), 5 g of C.I. Solvent Blue 70 and 50 g of ethyl acetate were placed in a separable flask, after the interior of the flask was filled with gaseous nitrogen, the foregoing polymer and dye were completely dissolved while stirring. Successively, after adding 90 g of a solution containing 2 g of sodium lauryl sulfate dropwise, the solution was emulsified by use of an ultra-sonic disperser (UH-150 type, produced by S. M. T. Co., Ltd.) for 300 seconds. Thereafter, ethyl acetate was removed under reduced pressure to obtain colored fine particles. Further, 0.1 g of potassium persulfate was added and dissolved in the dispersion solution, and heated to 70° C. by inserting a heater into the solution, and further, a solution of a mixture of 2 g of styrene and 0.5 g of polyethyleneglycolmethacrylate (average added unit number: 4) were added dropwise and reacted for 7 hours to obtain core-shell type colored fine particles (average particle diameter: 98 nm).

Example of Synthesis 3

Core-shell Type Pigment Colored Fine Particle 10 g of C.I. Pigment Red 122, 5 g of polymeric surfactant LATEMUL (manufactured by Kao Corp.), and 50 g of ion-exchanged water were mixed and dispersed by adding 250 g of zirconia beads having an average particle diameter of 0.5 mm using a media disperser (SystemZeta manufactured by Ashizawa Corp.) for 4 hours. To the dispersion, 0.1 g of potassium persulfate was added and dissolved, and after heating to 80° C., 3 g of styrene and a solution of a mixture of 2 g of 2-hydroxyethylmethacrylate were added thereto dropwise, and reacted for 7 hours to obtain pigment colored fine particles which were shell-coated with a resin (average particle diameter: 193 nm).

Comparative Example 1

Comparative colored fine particles (average particle diameter: 95 nm) were synthesized in the same way as for the recipe of (Example of Synthesis 1), except that the amount of 2-hydroxyethylmethacrylate was changed to 2.5 g from 1.0 g.

Comparative Example 2

Comparative colored fine particles (average particle diameter; 250 nm) were synthesized in the same way as for the recipe of Example of Synthesis 3, except that only 5 g of styrene was used to obtain a shell instead of using 2-hydroxyethyl methacrylate.

Comparative Example 3

Comparative pigment colored fine particles (average particle diameter: 260 nm) were synthesized in the same way as for the prescription of Example of Synthesis 3, except that only 5 g of 2-hydroxyethyl methacrylate was used to obtain a shell instead of using styrene.

<Characteristics Evaluation Test>

<<Test 1>> Dye Colored Fine Particles

At first, dye colored fine particles (Examples of Synthesis 1 and 2, and Comparative Example 1) synthesized by the above method were weighed to an amount of the dye colored fine particles being 2 weight % of the dye content of the finally produced ink. Then, the following solution was prepared using 15% ethylene glycol, 15% glycerin, 0.3% SUR-FYNOL 465 (manufactured by NISSHIN CHEMICAL INDUSTRY CO., LTD.), and the remaining portion was made up with water. Further, the obtained dispersion was filtrated through a 2 μm membrane filter to eliminate dust and coarse particles to prepare the ink-jet ink shown in Table 1, designated as ink-jet inks 1 through 5. In order to evaluate the dispersion stability and the ink storage stability of each ink, the ink was preserved in an oven at a temperature of 60° C. for 7 days. Then, the particle diameter variation ratio was evaluated by measuring the particle diameter before and after the 7 days of baking using the aforementioned laser particle diameter analyzing system manufactured by OTSUKA ELECTRONICS CO., LTD. Also, the filterability of each ink was evaluated by filtration of the preserved ink through an 8 μm membrane filter.

In order to evaluate discharge stability, each ink was printed onto Konica Photo-jet Paper, Photolike QP Glossy Paper (manufactured by Konica Corp.) using an ink-jet printer (PM-800) manufactured by SEIKO EPSON Corp. Subsequenrly, discharge stability and water resistance of obtained images were evaluated.

<Particle diameter variation ratio>

After 7 days preservation of each ink at a temperature of 60° C., the particle variation ratio was rated as;

A: (good level) less than 5%
B: (permissible level) from 5 to 10%
C: (failing level) more than 10%

<Ability to be filtered; Filtrability (or capability of being filtered)>

After 7 days preservation of each ink at a temperature of 60° C., 5 ml of each ink was filtrated through a 0.8 μm cellulose acetate membrane filter and filterability was graded as;

A: (good level) filtrated all of the volume
B: (permissible level) filtrated at least half of the volume
C: (failing level) filtrated less than half of the volume <Discharge Stability>

Each ink was ejected continuously from nozzles of an ink-jet printer and discharge stability was graded as;

A: (permissible level) nozzle clogging does not occur for more than 10 min.
B: (failing level) nozzle clogging occurs within 10 min.

<Water resistance>

Water was dropped onto an obtained print from a micropipette and one minute later the portion was rubbed with a finger. Water resistance was then determined visually to judge whether the image became indistinct or not as;

A: (good level) the image is practically not changed
B: (permissible level) the image becomes indistinct but recognizable
C: (failing level) the image becomes indistinct and not recognizable The result of above evaluations is shown below.

TABLE 1

| Ink | Colored fine particle | Particle diameter variation ratio | Filter-ability | Discharge stability | Water resistance | Remarks |
|---|---|---|---|---|---|---|
| 1 | Example of Synthesis 1 | A | A | B | A | Inv. |
| 2 | Example of Synthesis 2 | A | A | B | A | Inv. |
| 3 | Comparative Example 1 | C | C | C | C | Comp. |

Inv.: Inventive sample
Comp.: Comparative sample

<<Test 2>> Pigment Colored Fine Particle

Dye colored fine particles (Example of Synthesis 3 and and Comparative Examples 2 and 3) synthesized by the above method were weighed so that the amount of the dye colored fine particles became 3 weight % of the dye content of the finally produced ink. Then, the following solution was prepared using 15 weight % ethylene glycol, 15 weight % glycerin, 3 weight % triethyleneglycolmonobutyleter, 0.3 weight % SURFYNOL 465 (manufactured by NISSHIN CHEMICAL INDUSTRY CO., LTD.), and the remaining portion was made up with water. Further, the obtained dispersion was filtrated through a 2 μm membrane to eliminate dust and coarse particles to prepare the ink-jet ink shown in Table 2, designated as ink-jet inks 6 through 9. Identical to Test 1, each ink was preserved at 60° C. for 7 days and a particle diameter variation ratio, filterability, and also discharge stability of each ink, and further, water resistance of the image which was printed by use of each ink were evaluated and the results are shown in Table 2

TABLE 2

| Ink | Colored fine particle | Particle diameter variation ratio | Filter-ability | Discharge stability | Water resistance | Remarks |
|---|---|---|---|---|---|---|
| 4 | Example of Synthesis 3 | B | A | A | B | Inv. |
| 5 | Comparative Example 2 | C | B | B | C | Comp. |
| 6 | Comparative Example 3 | C | C | C | C | Comp. |

A colored fine particle dispersion for an ink-jet ink to exhibit excellent water resistance and good color reproduction can be obtainable. The colored fine particle dispersion exhibits excellent stability during production and exhibits excellent dispersion stability.

What is claimed is:

1. A water-based ink for ink-jet printing, comprising colored particles containing:
   (a) a core having a dye and a polymer, wherein the core is prepared by a method in which an oil dye is dissolved in a monomer and after being emulsified in water the dye is incorporated into the polymer by polymerization; and
   (b) a shell having a polymer comprising monomers having a hydroxyl group and encapsulating the core,
   wherein a total weight of the monomers is an amount of 0.1 to 50 weight % based on the total weight of the shell.

2. The water-based ink of claim 1 wherein the polymer in the shell does not comprise monomers having a dissociation group exhibiting a pKa value of 3 to 7.

3. The water-based ink of claim 1 wherein the monomers having a hydroxyl group are selected from the group consisting of hydroxyalkyl esters of methacrylic acid.

4. The water-based ink of claim 1, wherein the colored particles have a volume average particle diameter of at most 100 nm.

5. The water-based ink of claim 1, wherein the shell is made by a process comprising the steps of:
   (a) adding into a water dispersion of the core a mixture of monomers comprising monomers having a hydroxyl group in an amount of 0.1 to 50 weight % based on the total weight of the mixture of the monomers; and
   (b) polymerizing the mixture of the monomers on the surface of the core to form the shell.

6. An image forming method comprising the step of:
   jetting droplets of an ink of claim 1 through a plurality of ink-jet head nozzles onto an image receiving media in accordance with a digital signal supplied to an inkjet apparatus.

7. The image forming method of claim 6, wherein the colored particles have a volume average particle diameter of at most 100 nm.

* * * * *